(12) United States Patent
Teltschik et al.

(10) Patent No.: US 7,419,765 B2
(45) Date of Patent: Sep. 2, 2008

(54) METHOD FOR PRODUCING FLEXOGRAPHIC PRINTING PLATES BY MEANS OF LASER ENGRAVING

(75) Inventors: Margit Teltschik, Karlstadt (DE); Uwe Stebani, Flörsheim-Dalsheim (DE); Jens Schadebrodt, Mainz (DE); Volker Jansen, Leonberg (DE)

(73) Assignee: XSYS Print Solutions Deutschland GmbH (DE)

( * ) Notice: Subject to any disclaimer, the term of this patent is extended or adjusted under 35 U.S.C. 154(b) by 0 days.

(21) Appl. No.: 10/580,514

(22) PCT Filed: Nov. 17, 2004

(86) PCT No.: PCT/EP2004/013012

§ 371 (c)(1),
(2), (4) Date: Mar. 20, 2007

(87) PCT Pub. No.: WO2005/061231

PCT Pub. Date: Jul. 7, 2005

(65) Prior Publication Data

US 2007/0254242 A1 Nov. 1, 2007

(30) Foreign Application Priority Data

Nov. 27, 2003 (DE) ................. 103 55 991

(51) Int. Cl.
*B41N 3/00* (2006.01)
*G03C 1/00* (2006.01)
*G03C 5/00* (2006.01)
*G03F 7/00* (2006.01)
*B08B 5/04* (2006.01)

(52) U.S. Cl. ................ 430/302; 101/463.1; 134/21; 430/270.1; 430/286.1; 430/302; 430/325

(58) Field of Classification Search ............ 430/270.1, 430/286.1, 302, 325
See application file for complete search history.

(56) References Cited

U.S. PATENT DOCUMENTS

| | | | |
|---|---|---|---|
| 4,097,251 A * | 6/1978 | Murayama et al. ............ 95/274 |
| 4,942,284 A | 7/1990 | Etcheparre et al. | |
| 5,259,311 A | 11/1993 | McCaughey, Jr. | |
| 5,798,202 A | 8/1998 | Cushner et al. | |
| 5,855,651 A | 1/1999 | Kurita et al. | |
| 6,019,952 A * | 2/2000 | Haupt ........................ 423/210 |
| 6,494,965 B1 * | 12/2002 | Walker et al. ................. 134/21 |
| 6,531,682 B1 | 3/2003 | Güttler | |
| 6,645,699 B2 * | 11/2003 | Verschueren et al. ........ 430/302 |
| 6,776,095 B2 | 8/2004 | Telser et al. | |
| 6,935,236 B2 * | 8/2005 | Hiller et al. ............. 101/401.1 |
| 2003/0136285 A1 * | 7/2003 | Telser et al. ............. 101/463.1 |
| 2003/0197909 A1 | 10/2003 | Beyer et al. | |
| 2004/0115562 A1 | 6/2004 | Kaczun et al. | |

FOREIGN PATENT DOCUMENTS

| | | |
|---|---|---|
| DE | 39 23 829 | 1/1991 |
| DE | 103 05 258 | 8/2003 |
| DE | 102 11 810 | 10/2003 |
| EP | 0 330 565 | 8/1989 |
| EP | 1 162 315 | 12/2001 |
| EP | 1 162 316 | 12/2001 |
| WO | WO-93/23252 | 11/1993 |
| WO | WO-99/38643 | 8/1999 |
| WO | WO-02/49842 | 6/2002 |
| WO | WO-02/076739 | 10/2002 |
| WO | WO-02/083418 | 10/2002 |

OTHER PUBLICATIONS

Haferkamp, H. et al., "The Fume Hazard in Laser Materials Processing of Organic Materials", The Industrial Laser User 14 (1999), pp. 30-33.
Haferkamp, H. et al., "Effizientes und wirtschaftliches Abluftreinigungsverfahren fur die thermische Polymerwerkstoffbearbeitung", Wasser, Luft und Boden, Vereinigte Fachverlag Kraussknopf-Indenieur Digest 7/8 (2001), pp. 69-72.
Klobucar, Joseph M., "Pollutant Destruction: Comparing Thermal-Oxidizer Designs", Chemical Engineering (2002), pp. 62-67.
Haferkamp, H. et al., "Ablufte aus der Laserbearbeitung von Kunststoffen richtig filtrieren", Laser Mazain 6 (1998), pp. 6-11.
Goede, Martin, "Entstehung und Minderung der Schadstoffemissionen bei der Laserstrahlbearbeitung von Polymerwerkstoffen" Reihe 5, Nr. 587 (2000), pp. 1-144.

* cited by examiner

*Primary Examiner*—Dah-Wei Yuan
*Assistant Examiner*—Chanceity N Robinson
(74) *Attorney, Agent, or Firm*—Connolly Bove Lodge & Hutz

(57) ABSTRACT

Process for the production of flexographic printing plates by means of direct laser engraving, in which the particulate and gaseous degradation products formed in the course of the engraving are taken up by means of a suction apparatus, and the waste gas stream laden with the degradation products is purified by means of a combination of at least one solids filter and at least one oxidatively operating purification stage.

8 Claims, 6 Drawing Sheets

METHOD FOR PRODUCING FLEXOGRAPHIC PRINTING PLATES BY MEANS OF LASER ENGRAVING

RELATED APPLICATIONS

Figure 1:
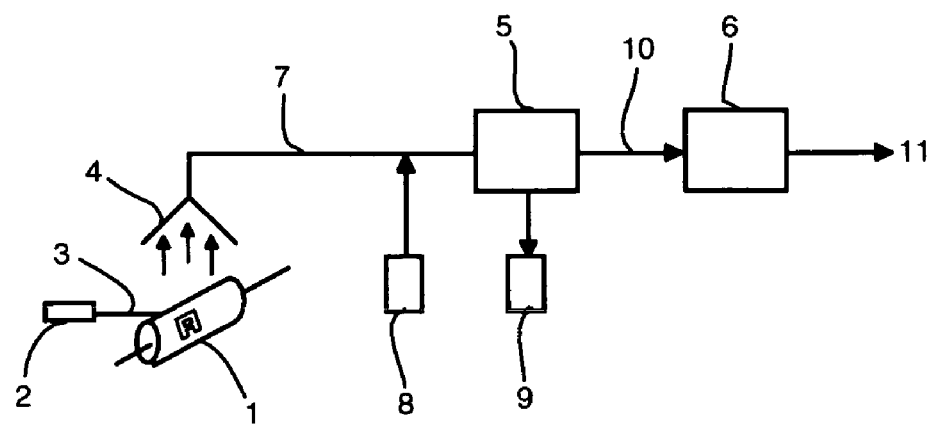

This application is a national stage application (under 35 U.S.C. 371) of PCT/EP2004/013012 filed Nov. 17, 2004 which claims benefit o German application 103 55 991.4 filed Nov. 27, 2003.

The present invention relates to a process for the production of flexographic printing plates by means of direct laser engraving, in which the particulate and gaseous degradation products formed in the course of the engraving are taken up by means of a suction apparatus, and the waste gas stream laden with the degradation products is purified by means of a combination of at least one solids filter and at least one oxidatively operating purification stage.

In direct laser engraving for the production of flexographic printing plates, a printing relief is engraved directly into the relief-forming layer of a flexographic printing element by means of a laser. A subsequent development step, as in the conventional process for the production of flexographic printing plates, is no longer required. The production of flexographic printing plates by means of direct laser engraving is known in principle, for example from U.S. Pat. No. 5,259, 311, WO 93/23252, WO 02/49842, WO 02/76739 or WO 02/83418.

In direct laser engraving, the relief layer absorbs laser radiation to an extent such that it is removed or at least detached in those parts where it is exposed to a laser beam of sufficient intensity. The layer or the components thereof are evaporated and/or decomposed, so that their decomposition products are removed from the layer in the form of hot gases, vapors, fumes, aerosols or small particles. In particular, powerful IR lasers, for example $CO_2$ lasers or Nd-YAG lasers, are customary for engraving. Suitable apparatuses for engraving flexographic printing plates are disclosed, for example, in EP 1 162 315 and EP 1 162 316.

Typical relief layer thicknesses of flexographic printing plates are usually from 0.5 to 7 mm. The nonprinting wells in the relief are at least 0.03 mm in the screen area and substantially more in the case of other negative elements and can assume values of up to 3 mm in the case of thick plates. In direct laser engraving, large amounts of material therefore have to be removed by means of the laser. At an engraving depth of only from 0.5 to 0.7 mm and on average 70% degree of ablation, about 500 g of material per $m^2$ of plate are ablated. Direct laser engraving differs in this respect very substantially from other techniques from the area of printing plates in which lasers are used only for recording a mask, but the actual production of the printing plate is still effected by means of a washout or development process. Such laser-recordable masks usually have a thickness of only a few μm. The amounts of material to be removed are in this case therefore usually only from 2 to 6 $g/m^2$.

Under the influence of the laser radiation, the material of the relief-forming layer is on the one hand evaporated and, on the other hand, split into larger or smaller fragments. This results in the formation of, on the one hand, tacky organic aerosols having a particle diameter of, usually, <1 μm and moreover volatile organic substances. The volatile components may be both different pyrolysis products and defined monomers which are produced by thermal depolymerization of polymeric components. Modern flexographic printing plates usually contain binders which contain styrene and butadiene and/or isoprene as monomeric building blocks.

These may be, for example, block copolymers of the styrene/butadiene or of the styrene/isoprene type. Further components of flexographic printing plates, for example plasticizer oils, may also contain butadiene or isoprene as building blocks. By depolymerization of binders and plasticizers, large amounts of styrene and isoprene or butadiene, in addition to other degradation products, form during the engraving of flexographic printing plates based on SIS or SBS rubbers. Further details on the resulting decomposition products and on the handling thereof are disclosed, for example, in Martin Goede, *Entstehung und Minderung der Schadstoffemissionen bei der Laserstrahlbearbeitung von Polymerwerkstoffen*, Fortschritt-Berichte VDI, Series 5, No. 587, Düsseldorf, VDI-Verlag, 2000.

Laser apparatuses for cutting or engraving usually have suction apparatuses by means of which the degradation products formed are taken up. Examples of laser heads with integrated suction are disclosed in EP-B 330 565 or WO 99/38643. The contamination of both the apparatus and the workplace with the degradation products is avoided thereby.

During the laser engraving of flexographic printing plates, a waste gas stream which, in addition to the aspirated air, contains large amounts of gaseous products, in particular styrene, butadiene and/or isoprene, and large amounts of tacky aerosols forms. The degradation products cannot simply be released into the environment, but the waste gases have to be purified in order to comply with the permissible limits. For example, according to the German technical instructions for air pollution control, the waste gas is not permitted to contain more than 1 mg of butadiene per $m^3$.

WLB Wasser, *Luft und Boden*, 7/8 (2001), 69 (VF Online Medien GmbH & Co. KG, Mainz) discloses a waste air purification system for thermal polymer material processing, which comprises a combination of two different filters. In a solids filter, the aerosols are first deposited using an inert assistant, and the gaseous components are then absorbed in an active carbon absorber bed.

However, this process for waste gas purification is not sufficiently cost-efficient when used in the area of direct laser engraving of flexographic printing plates. Butadiene and isoprene are only very poorly absorbed onto active carbon. The maximum loading of butadiene on active carbon at room temperature is only about 4% by weight. The capacity of a load is therefore very rapidly exhausted.

Furthermore, very intensive suction is required during the laser engraving of flexographic printing plates, in order to prevent very tacky aerosols formed in the course of the engraving from being deposited again on the printing surface of the plate. The redeposition of aerosols on the surface is very undesirable since the printed image is considerably adversely affected by the deposits during printing. Where polymers are deposited again, the surface of the printing plate must therefore be subsequently cleaned with a suitable cleaning agent, for example with a conventional flexographic washout agent, after the engraving. Since the printing plates swell in the flexographic washout agent, the printing plate must be carefully dried again prior to use. This usually takes from 2 to 3 hours and is highly undesirable since the time benefit over conventional processing is eliminated again thereby.

In order to avoid redeposition, typically at least 0.5 $m^3$ of air per g of the decomposition products is required for suction. The waste gas during the direct laser engraving of flexographic printing plates is therefore characterized by very high volume flow rates at low loading. The gaseous products are contained only in low concentration in the gas stream, and the adsorption-desorption equilibrium on active carbon is unfavorable for complete separation of butadiene. Very large active carbon filters are therefore required, and the costs for disposal and/or reactivation of the active carbon are accordingly very high. Although zeolites adsorb butadiene and isoprene better than active carbon, they are substantially more expensive than active carbon. Moreover, costs for reactivation and/or disposal are still incurred.

Furthermore, it is necessary to take account of the fact that units for the direct laser engraving of flexographic printing plates are not large units on an industrial scale. Rather, the engraving of printing plates takes place close to the end user and locally, either in a printing works or in a process engraver, i.e. in typical small operations or medium-sized operations. The units are not operated completely continuously but batchwise. A waste gas purification unit for the direct laser engraving of flexographic printing plates must also take account of these boundary conditions.

Accordingly, a process for the production of flexographic printing plates by means of direct laser engraving by engraving a relief into a laser-engravable flexographic printing element using a laser apparatus has been found, which laser apparatus comprises at least one unit for holding a cylindrical substrate for flexographic printing elements in which the cylindrical substrate can be rotatably mounted, one drive unit for rotating the cylinder, one laser head which emits at least one laser beam, the laser head and the holding unit with the cylindrical substrate being mounted so as to be displaceable coaxially relative to one another, and one suction apparatus, and in which a laser-engravable flexographic printing element at least comprising a dimensionally stable substrate and an elastomeric, relief-forming layer having a thickness of at least 0.2 mm, comprising at least one elastomeric binder, is used as starting material, the process comprising at least the following steps:

(a) application of a laser-engravable flexographic printing element to the cylindrical substrate and mounting of the cylindrical substrate in the holding unit, (b) rotation of the cylindrical substrate, (c) engraving of a printing relief into the relief-forming layer with the aid of the at least one laser beam, the depth of the relief elements to be engraved by means of the laser being at least 0.03 mm, the particulate and gaseous degradation products formed in the course of the engraving being taken up by means of the suction apparatus, and the waste gas stream laden with the degradation products being purified by means of a system comprising at least two different filter units, particulate degradation products being deposited in a first filter unit in the presence of a finely divided, nontacky solid by means of a solids filter and remaining gaseous degradation products then being removed oxidatively from the waste gas stream in a second filter unit.

LIST OF FIGURES

FIG. 1: Schematic diagram of the process comprising suction means (4), solids filter (5) and oxidative purification stage (6)

Figure 2:
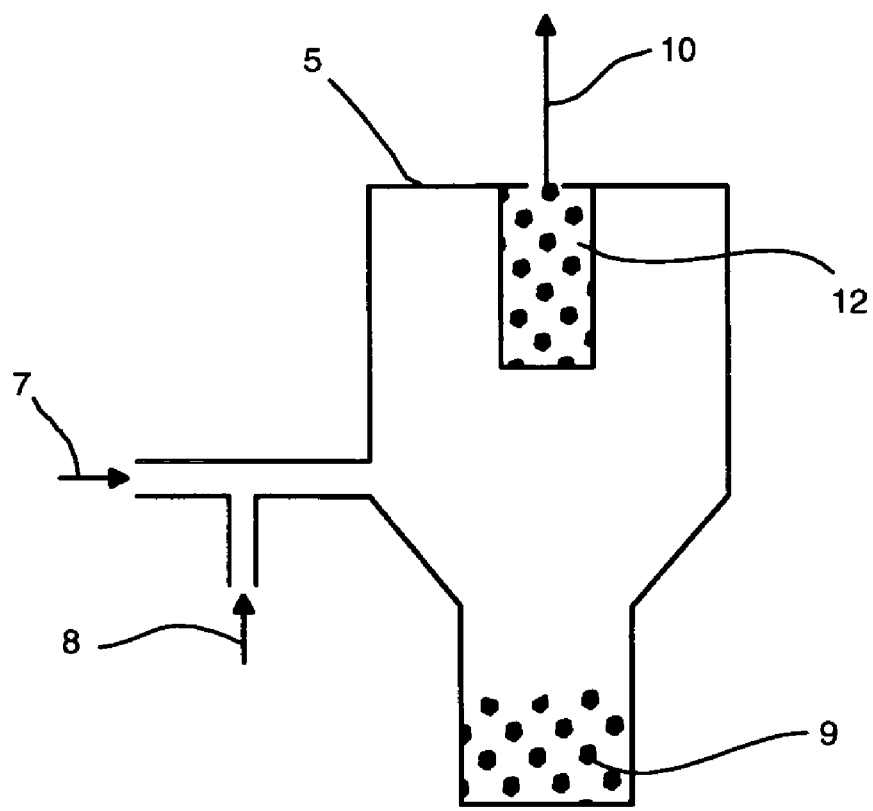

FIG. 2: Schematic diagram of the solids filter (5)

Figure 3:
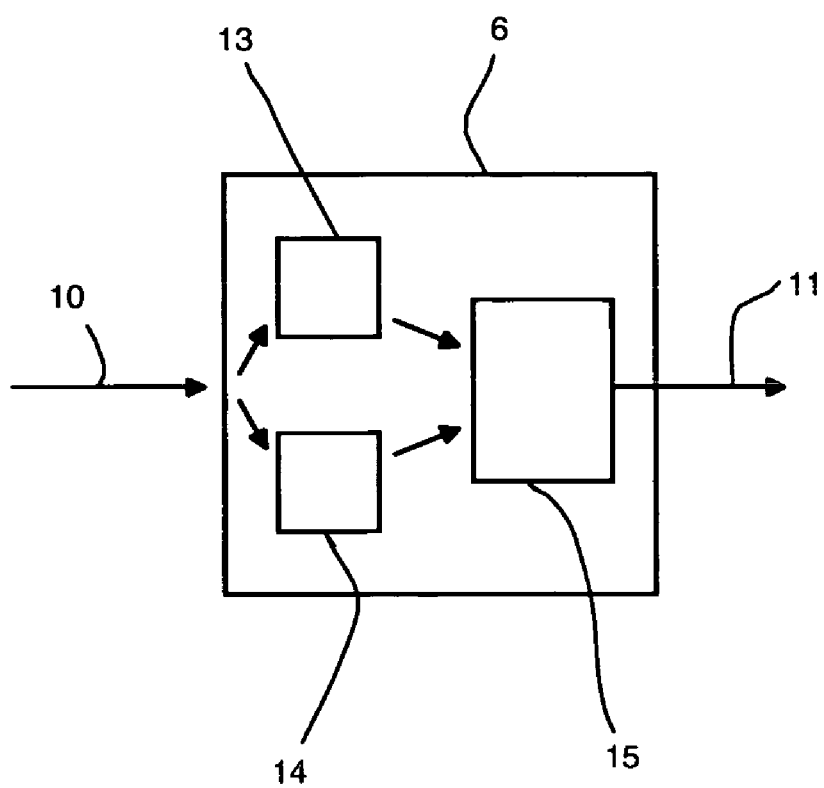

FIG. 3: Schematic diagram of the oxidative purification stage (6)

Figure 4:
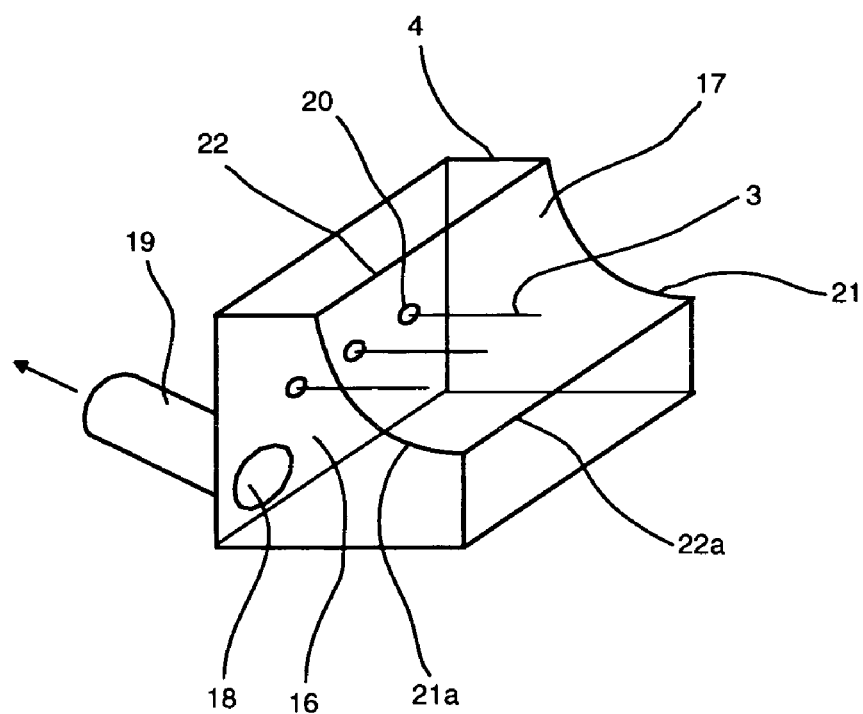

FIG. 4: Schematic diagram of a preferred embodiment of the suction means

Figure 5:
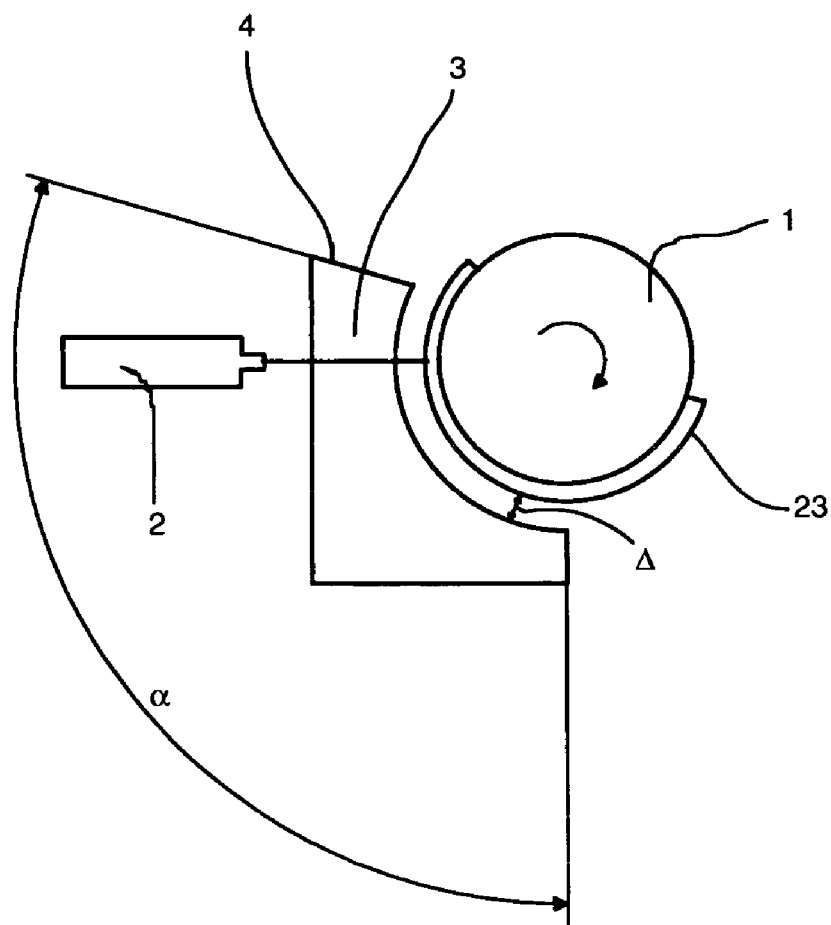

FIG. 5: Section through a preferred embodiment of the suction means

Figure 6:
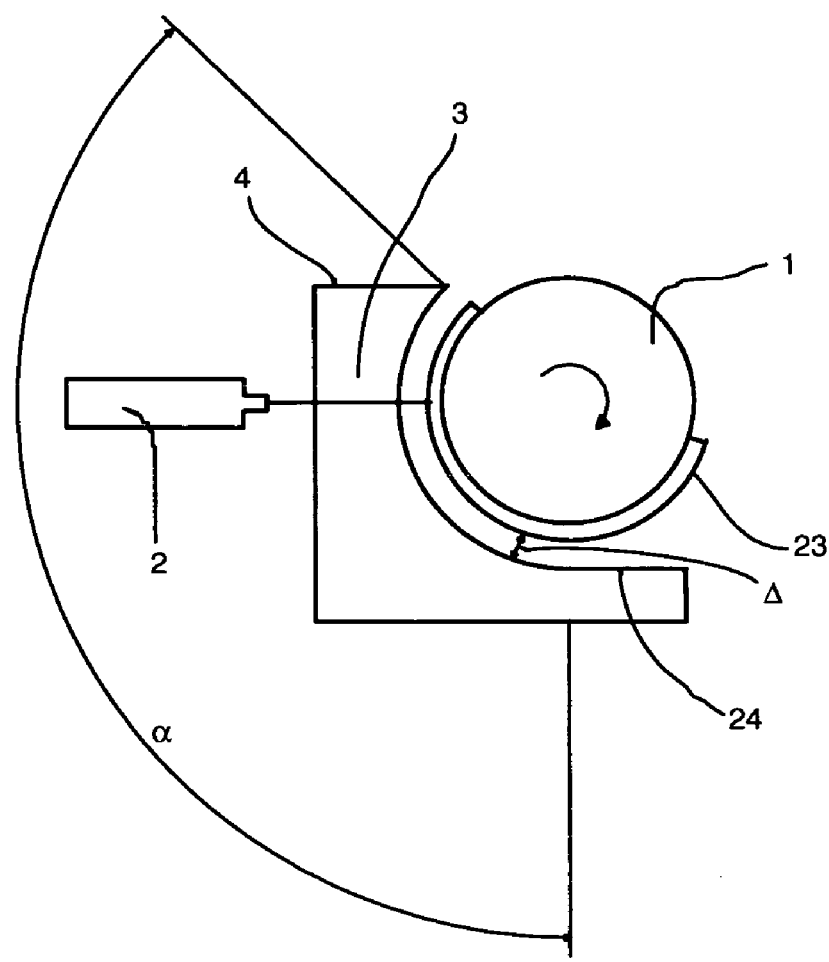

FIG. 6: Section through another preferred embodiment of the suction means

Regarding the invention, the following may be stated specifically:

A laser-engravable flexographic printing element which comprises, in a manner known in principle, at least one dimensionally stable substrate and an elastomeric, relief-forming layer having a thickness of at least 0.2 mm, preferably at least 0.3 mm, particularly preferably at least 0.5 mm, is used as starting material for carrying out the novel process. Usually, the thickness is from 0.5 to 2.5 mm.

The dimensionally stable substrate may be, in a manner known in principle, a polymer film or metal foil, or may be a cylindrical sleeve. The relief-forming layer comprises at least one elastomeric binder. Examples of suitable elastomeric binders include natural rubber, polybutadiene, polyisoprene, styrene/butadiene rubber, nitrile/butadiene rubber, butyl rubber styrene/isoprene rubber, polynorbornene rubber or ethylene/propylene/diene rubber (EPDM) or thermoplastic elastomeric block copolymers of styrene/butadiene or styrene/isoprene type. The relief-forming layer is usually obtained by crosslinking a crosslinkable layer which comprises at least said binders and components suitable for crosslinking, for example ethylenically unsaturated monomers, and suitable initiators. The crosslinking can be carried out, for example, photochemically. Furthermore, absorbers for laser radiation, plasticizers and other assistants, such as dyes, dispersants or the like, may optionally be used. Laser-engravable flexographic printing elements are known in principle. Laser-engravable flexographic printing elements may comprise only one relief-forming layer or a plurality thereof of identical, similar or different structures. Details of the structure and of the composition of laser-engravable flexographic printing elements are disclosed, for example, in WO 93/23252, WO 93/23253, U.S. Pat. No. 5,259,311, WO 02/49842, WO 02/76739 or WO 02/83418, which is hereby incorporated by reference.

The novel process is not limited to the use of very specific flexographic printing elements as starting materials. However, the advantages of the process are very particularly displayed in the case of those flexographic printing elements whose relief-forming layer comprises components comprising butadiene and/or isoprene units as building blocks. Examples of these are in particular binders which comprise butadiene and/or isoprene units, such as natural rubber, polybutadiene, polyisoprene, styrene/butadiene rubber, nitrile/butadiene rubber, styrene/isoprene rubber or thermoplastic elastomeric block copolymers of the styrene/butadiene or styrene/isoprene type, such as SBS or SIS block copolymers. Further examples are plasticizers, comprising butadiene or isoprene, such as oligomeric styrene/butadiene copolymers, liquid oligobutadienes or oligoisoprenes, in particular those having a molecular weight of from 500 to 5000 g/mol, or liquid oligomeric acrylonitrile/butadiene copolymers. In the direct laser engraving of such flexographic printing elements, a waste gas having a particularly high content of butadiene and/or isoprene forms, which waste gas can nevertheless be reliably and economically purified by means of the inventive process.

The laser apparatus used for carrying out the novel process is an apparatus having a rotating cylinder. In a manner known in principle, the apparatus has a unit for holding a cylindrical substrate for flexographic printing elements, so that a cylindrical substrate can be rotatably mounted. The holding unit is connected to a drive unit, by means of which the cylinder can be rotated. In order to ensure smooth running, the cylindrical substrate should usually be supported on both sides. Such apparatuses are known in principle. Their structure and their mode of operation are described, for example, in EP-A 1 262 315, EP-A 1 262 316 or WO 97/19783. Details are described in particular in EP-A 1 262 315, pages 14 to 17.

The cylindrical substrate may be, for example, a substrate roll comprising metal or other materials, on which a conventional sheet-like flexographic printing element on a flexible substrate is adhesively bonded by means of a double-sided adhesive tape. However, sleeves may also be used as flexographic printing elements. In the case of sleeves, a relief-forming layer is applied directly or indirectly to a cylindrical substrate, for example comprising aluminum or plastics. The sleeve is installed as such in the printing press. As a rule, the substrate is completely surrounded by the relief-forming layer. The term continuous seamless sleeve is then employed. For improving the printing properties, a resilient substructure may also be present between relief-forming layer—optionally with or without a dimensionally stable substrate.

Sleeves can be mounted directly in the holding unit. In this case, the cylindrical substrate of the sleeve is identical to the cylindrical substrate of the apparatus. Sleeves may also be pushed onto a substrate roll and fixed. Advantageously, air cylinders in which the pushing on and moving of the sleeves on the substrate cylinder is supported by an air cushion comprising compressed air can be used for sleeves. The relevant details are to be found, for example, in Technik des Flexodrucks, page 73 et seq., Coating Verlag, St. Gallen, 1999.

The apparatus furthermore has a laser head which emits at least one laser beam. Heads which emit a plurality of laser beams, for example 3 laser beams, are preferably used. They may have different powers. The laser head and the cylindrical substrate are mounted so as to be displaceable coaxially relative to one another. During operation of the apparatus, the cylindrical substrate is rotated and the laser beam and the cylinder are displaced translationally relative to one another so that the laser beam gradually scans the entire surface of the flexographic printing element and, depending on the control signal, ablates the surface to a greater or lesser extent by corresponding beam intensity. The manner in which the translational movement between the laser head and the cylinder occurs is not important with regard to the invention. The cylinder or the laser head or both may be displaceably mounted.

The apparatus used according to the invention furthermore has an apparatus for extracting by suction the degradation products formed in the course of the engraving. The suction should be arranged as close as possible to the point at which the laser beam strikes the surface of the relief-forming layer. It may be, for example, a bell arranged on top. The suction can be fixed in the apparatus or, in the case of a displaceably mounted laser head, can preferably be moved together with the laser head. Designs of suction means for laser heads are known in principle to a person skilled in the art. Reference may be made to WO 99/38643 or EP-A 330 565 by way of example.

The entire apparatus is advantageously encapsulated in order better to suppress undesired emergence of the degradation products into the environment. The access to the interior of the apparatus, in particular to laser head and substrate cylinder, is ensured via closable flaps, doors, sliding doors or the like.

The novel process and preferred embodiments are shown schematically by means of FIGS. 1 to 6. The figures are intended to permit better understanding without it being intended to limit the invention thereby to the embodiment shown.

FIG. 1 shows a schematic diagram of the entire process. The cylinder (1), on which a flexographic printing element is mounted, is shown. A laser (2) emits a laser beam (3), by means of which the relief-forming layer is engraved. For the sake of clarity, only one laser and only one beam are shown, but a plurality of beams of a plurality of identical or different types of lasers, for example $CO_2$ lasers or Nd-YAG lasers, are also possible. The degradation products of the layer which are produced by the laser are extracted via a suction means (4), and the mixture of air, aerosols and gaseous degradation products (7) is fed via a pipe to the filter unit. For greater clarity, intake units, such as fans, vacuum pumps or the like, which are required for aspiration and transport of the waste gas, have been omitted in the diagram. Depending on the pressure drop of the entire apparatus, a single intake unit may be sufficient, or it may be necessary to install a plurality of intake units at different points in the installation.

The aspirated gas volume per unit time (waste air volume flow rate) and the amount of material degraded per unit weight are selected by a person skilled in the art taking into account the nature of the flexographic printing element used, the design of the laser head, the engraving conditions and accordingly the desired purity of the surface of the engraved printing plate. As a rule, the surface of the printing plate is less contaminated by degradation products the higher the waste air volume flow rate. Of course, a person skilled in the art may use a lower waste air volume flow rate if he is also satisfied with a lower purity of the surface for an application. As a rule, however, it is advisable to use a volume flow rate of at least 0.1 $m^3$ per g of degraded material. The volume flow rate is preferably at least 0.5, particularly preferably at least 1.0, $m^3/g$. In the case of a laser apparatus of average size, which is designed for engraving about 1 $m^2$ of plate/h and for an ablation of from 500 to 1000 $g/m^2$, this corresponds to a volume flow rate of at least from 50 to 100, preferably at least from 250 to 500, particularly preferably at least from 500 to 1000, $m^3/h$, depending on the ablation. The waste gas stream (7) is first purified in a solids filter or particle filter (5). Here, the particulate degradation products present in the gas stream, for example tacky aerosols, are separated off, while the gaseous components of the waste gas pass through the filter. The solids filter comprises filter elements suitable in a manner known in principle for separating off the solid particles. The separation of the particulate degradation products is carried out in the presence of a finely divided, nontacky solid. This prevents the tacky aerosols from clogging the filter elements. The finely divided solid can be metered directly into the solids filter. However, it is preferably fed into the pipe (7) upstream of the solids filter from a storage vessel (8), for example with the aid of a suitable carrier gas, in order to achieve very thorough mixing with the waste gas. The finely divided, nontacky solid coats the tacky aerosols and the filter elements. It thus prevents the solid from clogging the filters. Instead, a solid (9) which can be readily deposited results. Particularly suitable finely divided, nontacky solids are solids containing at least 50% of particles having a size of $\leq 20$ μm. Preferably, the fraction of particles $\leq 2$ μm is at least 50%.

Examples of suitable solids include loam, $CaCO_3$, active carbon, $SiO_2$, organically modified silicas, zeolites, finely divided powders of kaolinite, muscovite or montmorillonite. The amount of solid is determined by a person skilled in the art according to the type of waste gas. As a rule, an amount of from 0.1 to 10, preferably from 0.5 to 2, g of solid per g of ablated material has proven useful.

The design of the solids filter is not important with regard to the invention. A typical embodiment of a solids filter is shown in FIG. 2. The gas (7) laden with the solids is mixed with the finely divided solid (8) and is separated in a filter having one filter element (12) or preferably a plurality of filter elements (12). The result is a gas stream (10) which is substantially free of solids and contains only the gaseous or volatile degradation products. As a rule, a degree of separation more than 99%, based on the original amount of particulate degradation products, can be achieved. Certain fractions of the gaseous degradation products may under certain circumstances also be absorbed on the finely divided solid (8) itself and deposited in the solids filter. In the case of the filter elements, the conventional filter elements known in principle to a person skilled in the art, for example filter cartridges of ceramic materials, can be selected. Solids filters are commercially available.

The waste gas stream (10) still laden with the gaseous degradation products is passed into a second filter unit (6), in which the remaining gaseous degradation products are oxidatively degraded. A waste gas (11) which is substantially free of organic substances forms. Particularly suitable oxidizing agents are atmospheric oxygen and forms of active oxygen obtained therefrom, for example atomic oxygen or ozone.

The second filter unit may be, for example, a thermal postcombustion means. Such a unit may be fired in particular with mineral oil or with natural gas. Preferably, the waste gas is fed directly into the flame. Typical combustion temperatures are about 800° C. The thermal postcombustion means may be connected exclusively to the laser engraving unit. However, it may also be a waste gas combustion unit in which other waste gases or wastes are also incinerated. The waste gas originating from the laser engraving is then simply fed into the existing unit.

In a preferred embodiment of the invention, the oxidative purification stage comprises an apparatus for the catalytic oxidation of the waste gases. Here, the gaseous degradation products present in the waste gas are oxidized in the presence of a suitable catalyst, substantially to $CO_2$ and $H_2O$. Examples of suitable catalysts are noble metal catalysts on suitable supports or catalysts based on transition metal oxides or other transition metal compounds, for example of V, Cr, Mo, W, Co or Cu. A person skilled in the art makes a suitable choice from the possible catalysts according to the specific conditions. The choice of a catalyst also depends on the material to be engraved. Noble metal catalysts are as a rule more active than catalysts based on transition metals, but are more sensitive to catalyst poisons, such as $H_2S$ or other sulfur-containing compounds. For engraving flexographic printing elements which may contain S-containing compounds, e.g. S crosslinking agents, it is therefore advisable to use catalysts based on transition metal oxides. The catalytic purification stage is usually operated at from 250 to 400° C. Further details of the catalytic oxidation and catalysts suitable for this purpose are described in *Martin Goede, Entstehung und Minderung der Schadstoffemissionen bei der Laserstrahlbearbeitung von Polymerwerkstoffen*, Fortschritt-Berichte VDI, Series 5, No. 587, Düsseldorf, VDI-Verlag, 2000, pages 36 to 41, and the literature cited there, which is hereby incorporated by reference.

In a likewise preferred embodiment of the invention, the oxidative purification stage comprises an apparatus for the oxidation of the waste gases by means of a low temperature plasma. A low temperature plasma is generated not by thermal activation but by strong electric fields (electric gas discharges). Here, only a small amount of the atoms or molecules is ionized. In the low temperature plasma used according to the invention, oxygen radicals or radicals containing oxygen atoms, for example OH., are generated in particular from the oxygen contained in the waste gas and then in turn react with the gaseous degradation products of the relief-forming layer and degrade them oxidatively. Techniques for the generation of low temperature plasmas are known to a person skilled in the art. Reference may be made to U.S. Pat. No. 5,698,164 by way of example. Suitable reactors are also commercially available. For example, ozone can be generated with the aid of an ozone generator and is passed into the waste gas stream. The ozone-containing waste air can furthermore flow through an apparatus in which it is exposed to UV radiation, preferably predominantly UVC radiation. UV radiation generates additional radicals having an oxidizing effect and thus accelerates the degradation of volatile organic substances. Low temperature plasma generators are known.

In a preferred embodiment of the novel process, the second filter unit (6) also comprises a buffer unit upstream of the oxidative purification stage (15). This is shown schematically in FIG. 3. In a buffer unit (13, 14), the gaseous fractions in the waste gas are completely or partly collected and are gradually released again from there in a defined concentration to the oxidative purification stage. This advantageously makes it possible to trap peak concentrations of the gaseous degradation products in the waste gas, so that the filter unit need not be designed for peak operation but can operate more or less continuously, for example even when engraving is not being effected owing to a plate change.

The buffer unit can consist, for example, of two vessels (13, 14) which are filled with a suitable material for absorption. Suitable materials are, for example, zeolites, in particular hydrophobic zeolites having a pore size of from 5 to 6 Å. The buffers can be operated, for example, in such a way that the degradation products are first collected in an absorber until the latter has reached its maximum load. The system then switches over to the second absorber while the first one is emptied again, for example by a temperature increase and/or passing through gases, and the adsorbed organic substances are gradually released to the oxidative purification stage (15). Other embodiments of a buffer unit are of course also conceivable. For example, the waste gas could as a rule be passed directly into the oxidative purification stage, and a part of the waste gas stream could be diverted into the buffer only on exceeding a certain load of organic impurities, in order to avoid overloading of the oxidative purification stage. At a lower load, the content of the buffer can then be emptied again into the waste gas stream.

The novel process can of course also comprise further process steps and the apparatus used may also comprise further components. For example, one such component may be an additional filter unit in which $H_2S$ or other S-containing compounds are separated off in a targeted manner. This may be, for example, an absorptive filter stage (e.g. an alkaline wash) or biofilter.

It is possible for only a single unit for direct laser engraving to be connected to the described combination of two filter units. However, if a plurality of laser apparatuses is operated, it is also entirely possible for a plurality of laser apparatuses to be connected in a suitable manner to a single combination of filter units for joint purification of the waste gases of all laser apparatuses. In a particularly advantageous embodiment of the novel process, a special suction apparatus is used, as shown schematically in FIGS. 4 to 6. This ensures particularly complete and rapid extraction of the decomposition products and substantially prevents contamination of the surface of the engraved flexographic printing plates by decomposition products.

The suction apparatus (4) is connected to the laser head (the laser head has been omitted in FIG. 4 for the sake of clarity). If the laser head is movably mounted, said suction apparatus is moved together with the laser head. The suction apparatus is a hollow body which has a back (16) and a suction orifice (17) arranged opposite the back and is closed apart from the passages still to be described. The respective opposite surfaces can be arranged parallel to one another, but this is not essential. The surfaces can, if appropriate, also have curves, or two surfaces can also run one into the other without an edge. What is important with regard to the invention is the type and arrangement of the suction orifice (17) in addition to the functionally required passages.

The suction apparatus (4) has at least one passage (18) for connection of a suction pipe (19). The passage (18) is preferably present at the back (16) or on the underside of the apparatus, without it being intended to restrict the invention thereto. There may also be a plurality of passages for the waste gas. The back furthermore has at least one window (20) for the passage of a laser beam (3). It can of course also have more than one window if a plurality of laser beams are used. FIG. 4 shows three laser windows. One or more nozzles (17) by means of which compressed air or another gas for flushing is blown via the windows are preferably arranged in any desired position, adjacent to the windows, for example above or below the windows. This makes it possible to prevent the degradation products of the relief-forming layer from soiling or even completely clogging the laser windows. The nozzles have been omitted in the drawing for the sake of clarity.

The suction orifice (17) has two arc-shaped edges (21) and (21a) which are located opposite one another and as a rule horizontal and whose radius is adapted to the radius of the substrate cylinder. The lengths of the edges (21) and (21a) are preferably identical. FIG. 5 shows a cross section through the substrate cylinder (1) and the suction apparatus (4). A laser-engravable flexographic printing element (23) is mounted on the substrate cylinder (1). The substrate cylinder fits exactly into the sector formed by the arc-shaped edges. The distance between the edges (18) and (18a) and the surface of the flexographic printing element is denoted by Δ in the figure. As a rule, Δ should be <20 mm. Preferably, Δ is from 1 to 8 mm, particularly preferably from 2 to 5 mm. The distance between the surface of the substrate cylinder and the edges (21) and (21a) is of course greater than the distance Δ between the surface of the flexographic printing element and the edges.

The arc-shaped edges are preferably circular edges. In this case, the distance Δ along the total edge is identical. However, it may also be an edge which is elliptically shaped or has another arc shape. In this case, the distance Δ changes along the edge. In this case too, however, Δ should preferably be less than 20 mm at every point of the edge. A variable distance Δ may also occur when the substrate cylinder is exchanged for another substrate cylinder having a smaller radius. However, this should as far as possible be avoided, but suction means adapted in each case should also be stocked for substrate cylinders of different diameter.

The ends of the arc-shaped edges make the angle α with one another in each case. This angle defines the size of the suction orifice α may have a size of up to 180°. An angle α of from 30° to 180° has proven useful. The ends of the edges (21) and (21a) are connected to one another in each case by the edges (22) and (22a) located opposite one another. These edges, too, are preferably in each case at a distance A from the surface of the laser-engravable flexographic printing element.

The connecting edges may be straight edges (as shown in FIG. 4) or the edges may also have a curvature. They are preferably straight edges.

FIG. 6 shows a further embodiment of the suction apparatus. In this case, the edge (21) (or (21a), not shown) is furthermore extended by a linear edge (24). In this region, the distance A is no longer maintained. The angle α relates in each case only to the actual arc-shaped edge (21) or (21a), as shown in FIG. 6.

All edges should preferably be rounded in order to avoid unnecessary turbulences. In addition, a construction which serves for increasing the waste air capture cross section may be mounted around the edges (21), (21a), (22) and/or (22a). Suitable constructions are, for example, planar or curved metal sheets which are arranged in a collar-like or flange-like manner around the actual suction head.

Optionally, the suction apparatus may also have further passages, for example for passing through analytical instruments, measuring heads or the like, or the connections thereof.

Expediently, the suction apparatus is connected to the laser head, for example by quick-action clamping screws, in a manner such that it can be easily removed. This ensures that, when changing the cylindrical substrate for one having another radius, a new suction apparatus having an appropriately adapted radius can also be mounted without major loss of time.

For carrying out the novel process, a laser-engravable flexographic printing element is first mounted on the cylindrical substrate, and the cylindrical substrate is mounted in the holding unit. For mounting, the laser head and the cylindrical substrate are moved apart until problem-free mounting is possible. The order is unimportant. If it is a sheet-like flexographic printing element, the cylindrical substrate can first be installed in the apparatus and then the plate installed thereon. Alternatively, the cylinder and the flexographic printing element can first be preassembled outside the apparatus and then installed in the apparatus. When engraving a plurality of different flexographic printing elements in succession, it is of course possible to leave the substrate cylinder in the holding apparatus and to carry out the mounting of the flexographic printing element on the cylinder already installed in the holding apparatus. The same applies if a sleeve is used in combination with a substrate cylinder, for example an air cylinder. If the sleeve is self-supporting, i.e. is used without an additional cylinder, the relief layer is of course mounted on the cylindrical substrate itself. After the mounting, the cylindrical substrate provided with the flexographic printing element is rotated by means of the drive unit.

With the aid of the at least one laser beam, a print relief is then engraved into the relief-forming layer. The depth of the elements to be engraved depends on the total thickness of the relief and the type of elements to be engraved and is determined by a person skilled in the art according to the desired properties of the printing plate. The depth of the relief elements to be engraved is at least 0.03 mm, preferably at least 0.05 mm—the minimum depth between individual dots is mentioned here. Printing plates having relief depths which are too small are as a rule unsuitable for printing by means of the flexographic printing technique because the negative elements fill with printing ink. Individual negative dots should usually have greater depths. For those of 0.2 mm diameter, a depth of at least from 0.07 to 0.08 mm is usually advisable. Where areas have been removed by engraving, a depth of more than 0.15 mm, preferably more than 0.3 mm, particularly preferably more than 0.5 mm, is advisable. The latter is of course possible only in the case of a correspondingly thick relief.

The laser apparatus may have only a single laser beam. Preferably, however, the apparatus has two or more laser beams. The laser beams may all have the same wavelength, or laser beams of different wavelengths may be used. It is furthermore preferable if at least one of the beams is specially adapted for producing coarse structures and at least one of the beams for recording fine structures. With such systems, it is possible to produce high-quality printing plates in a particularly elegant manner. For example, the lasers may be $CO_2$ lasers, the beam for producing the fine structures having a lower power than the beams for producing coarse structures. For example, the combination of beams having a nominal power of from 150 to 250 W has proven particularly advantageous. Preferably only the edges of the relief elements and the uppermost layer section of the relief-forming layer are engraved with the beam for producing fine structures. The more powerful beams preferably serve for deepening the structures produced and for excavating larger non-printing depressions. The details do of course also depend on the motif to be engraved.

After complete engraving, the cylinder drive is switched off again and the finished flexographic printing plate or the finished sleeve is removed.

As a rule, no further cleaning of the printing plate with the aid of solvents is required. If appropriate, residues of dust or the like can be removed by simply blowing off with compressed air or brushing off.

If subsequent cleaning should be required, it is advisable to carry this out not by means of a strongly swelling solvent or solvent mixture but by using a solvent or solvent mixture which has little swelling activity. If the binders are binders which are soluble or swellable in organic solvents, for example styrene/butadiene or styrene/isoprene block copolymers, the subsequent cleaning can advantageously be effected by means of water or an aqueous cleaning agent. Aqueous cleaning agents substantially comprise water and optionally small amounts of alcohols and/or assistants, such as surfactants, emulsifiers, dispersants or bases. The subsequent cleaning can be effected, for example, by simple immersion or spraying of the relief printing plate or may be additionally supported by mechanical means, for example by brushes or plush pads. Conventional flexographic washing units may also be used.

By means of the novel process for the production of flexographic printing plates, the waste gas is effectively and economically purified. Required limits are complied with. It is not necessary for absorbers, for example active carbon, laden with degradation products to be reactivated or disposed of at high cost. As a result of the coating with a nontacky solid, the tacky aerosols, too, can be effectively deposited without blockage of the filter occurring. The unit may be designed to be small and compact. It is therefore particularly suitable for small and medium-sized operations.

We claim:

1. A process for the production of flexographic printing plates by means of direct laser engraving by engraving a relief in a laser-engravable flexographic printing element using a laser apparatus which comprises at least
    one unit for holding a cylindrical substrate for flexographic printing elements in which the cylindrical substrate can be rotatably mounted,
    one drive unit for rotating the cylinder,
    one laser head which emits at least one laser beam, the laser head and the holding apparatus with the cylindrical substrate being mounted so as to be displaceable coaxially relative to one another, and
    one suction apparatus,
    and in which a laser-engravable flexographic printing element at least comprising a dimensionally stable substrate and an elastomeric, relief-forming layer having a thickness of at least 0.2 mm, comprising at least one elastomeric binder, is used as starting material,
    the process comprising at least the following steps:
        (a) application of a laser-engravable flexographic printing element to the cylindrical substrate and mounting of the cylindrical substrate in the holding unit,
        (b) rotation of the cylindrical substrate,
        (c) engraving of a printing relief in relief-forming layer with the aid of the at least one laser beam, the depth of the relief elements to be engraved by the laser being at least 0.03 mm,
    wherein the particulate and gaseous degradation products formed in the course of the engraving are taken up by means of the suction apparatus, and the waste gas stream laden with the degradation products is purified by means of a system comprising at least two different filter units, particulate degradation products being deposited in a first filter unit in the presence of a finely divided, nontacky solid by means of a solids filter and remaining gaseous degradation products then being removed oxidatively by means of catalytic oxidation from the waste gas stream in a second filter unit, wherein the aspirated gas volume is at least 0,1 $m^3$ per g of degraded material and the second filter unit comprises a buffer unit upstream of the oxidative purification stage, in which the gaseous degradation products in the waste gas are completely or partly collected and are released in a defined concentration to the oxidative purification stage.

2. A process according to claim 1, wherein the oxidative degradation in the second filter unit is carried out by means of a low temperature plasma.

3. A process according to claim 1, wherein the finely divided, nontacky solid is at least one such solid selected from the group consisting of loam, $CaCO_3$, active carbon or $SiO_2$.

4. A process according to claim 1, wherein the suction apparatus is a hollow body which is connected to the laser head and which comprises at least one back (16) having at least one window (20) for the passage of one or more laser beams, an arbitrarily arranged passage (18) for connection of a suction pipe (19) and a suction orifice (17) located opposite the back, the suction orifice having two arc-shaped edges (21) and (21a) which are located opposite one another and whose radius is adapted to the radius of the substrate cylinder.

5. A process according to claim 4, wherein the distance Δ between the edges and the surface of a flexographic printing element present on the cylinder is from 1 to 20 mm.

6. A process according to claim 1, wherein the laser-engravable flexographic printing element used as starting material comprises components which comprise butadiene and/or isoprene as building blocks.

7. A process according to claim 6, wherein the flexographic printing element comprises binders based on styrene/butadiene and/or styrene/isoprene block copolymers.

8. A process according to claim 6, wherein the flexographic printing element comprises plasticizers comprising butadiene and/or isoprene.

* * * * *